United States Patent [19]
Mielnik et al.

[11] Patent Number: 5,355,901
[45] Date of Patent: Oct. 18, 1994

[54] APPARATUS FOR SUPERCRITICAL CLEANING

[75] Inventors: Richard J. Mielnik; John A. Metalonis; Richard K. Reber; Larry R. Rosio; Stephen H. Shore; Charles W. Smith, all of Erie, Pa.

[73] Assignee: Autoclave Engineers, Ltd., Erie, Pa.

[21] Appl. No.: 967,219

[22] Filed: Oct. 27, 1992

[51] Int. Cl.$^5$ .............................................. B08B 3/10
[52] U.S. Cl. ....................... 134/105; 134/111; 134/200; 134/147; 210/493.5; 210/314
[58] Field of Search ............... 134/107, 108, 111, 188, 134/200, 135, 186, 189, 193, 187, 195, 89, 147, 182; 210/455, 275, 314, 493.5; 68/181 R, 184, 187, 18 F

[56] References Cited

U.S. PATENT DOCUMENTS

| | | | |
|---|---|---|---|
| 524,409 | 8/1894 | Wrigh | 134/147 X |
| 909,604 | 1/1909 | Jaycox | 134/188 |
| 1,231,987 | 7/1917 | Bickford | 134/163 |
| 2,267,580 | 12/1941 | Turner | 134/163 X |
| 2,498,734 | 2/1950 | Bozanich | 134/111 |
| 3,041,212 | 6/1962 | Booth | 134/111 |
| 3,063,259 | 11/1962 | Hankison et al. | 62/317 |
| 3,293,912 | 12/1966 | Kochaney | 134/147 X |
| 3,948,679 | 4/1976 | Lewis | 134/111 X |
| 3,997,303 | 12/1976 | Newton | 55/97 |
| 4,151,400 | 4/1979 | Smith, Jr. et al. | 219/400 |
| 4,290,821 | 9/1981 | Cosby | 134/8 |
| 4,336,816 | 6/1982 | Horz | 134/138 |
| 4,441,871 | 4/1984 | Boller | 418/97 |
| 4,443,269 | 4/1984 | Capella et al. | 134/12 |
| 4,576,792 | 3/1986 | Martensson | 422/27 |
| 4,657,487 | 4/1987 | Schonwald et al. | 417/68 |
| 4,832,753 | 5/1989 | Cherry et al. | 134/22.18 |
| 4,844,743 | 7/1989 | Koblenzer et al. | 134/11 |
| 4,879,004 | 11/1989 | Oesch et al. | 203/89 |
| 4,936,922 | 6/1990 | Cherry | 134/22.18 |
| 4,961,327 | 10/1990 | Bolzoni et al. | 68/187 |
| 5,013,366 | 5/1991 | Jackson et al. | 134/1 |

FOREIGN PATENT DOCUMENTS

| | | | |
|---|---|---|---|
| 580472 | 11/1914 | France | 134/189 |
| 580749 | 9/1946 | United Kingdom | 134/188 |

OTHER PUBLICATIONS

"Supercritical Fluid Extraction Plant", published by KOBELCO, date unknown.
News Release "Hughes, Autoclave Agree to Develop Ozone-Friendly Precision Cleaning System"; Autoclave Engineers, Oct. 15, 1991.
NASA Tech Brief "Cleaning With Supercritical CO$_2$", Mar. 1979.

*Primary Examiner*—Frankie L. Stinson
*Attorney, Agent, or Firm*—Webb Ziesenheim Bruening Logsdon Lorkin & Hanson

[57] ABSTRACT

An apparatus for precision cleaning with carbon dioxide includes a pressure vessel having a removable cleaning drum with a sanitized work zone, a separator for regenerating spent carbon dioxide, and pressure and temperature monitoring and control devices to maintain the carbon dioxide in a supercritical state while it is circulated in contact with a part to be cleaned. The sanitized work zone is defined by an impermeable drum body having removable entry and exit filters to ensure that circulating cleaning fluid does not redeposit contaminants on the parts. The separator includes distillation means. The pressure vessel and separator form part of an overall system, including a storage vessel for carbon dioxide, a pump, a preheater, a let-down valve in communication with the pressure vessel outlet, a condenser and a bypass.

The carbon dioxide is maintained in liquid form in the storage vessel, raised above its critical temperature by the preheater, pumped into the pressure vessel to achieve critical pressure, circulated through the work zone for a predetermined period of time, and removed through the let-down valve. The separator regenerates the carbon dioxide and carbon dioxide gas is then condensed and sent to the storage vessel for reuse.

17 Claims, 4 Drawing Sheets

APPARATUS FOR SUPERCRITICAL CLEANING

BACKGROUND OF THE INVENTION

1. Field of the Invention

This application is related to precision cleaning systems and, more particularly, apparatus for cleaning parts with supercritical fluids, with or without supplemental cleaning techniques.

2. Description of the Prior Art

Today's manufacturing and assembly industries require parts which have a high degree of cleanliness. These requirements have led to development of an independent area of technology known as "precision cleaning". Precision cleaning may be defined as cleaning a given part to a degree that the level of foreign substances on the part meets a repeatably measurable standard. For example, parts which are to be chrome plated must be cleaned to a contaminant level of 20 micrograms per square centimeter, or less. Disc drive components for computers must be cleaned to a level less than 5 micrograms per square centimeter, and wafers utilized in the electronics industry must be cleaned to a level less than 1 microgram per square centimeter. The various contaminants removed by precision cleaning include dissolvables, such as cutting fluid, particulates, such as diamond dust, and ionic bindings. Applications for precision cleaning include the manufacture of pens, razors and computer chips as well as various electronics industry applications.

The problem with presently available precision cleaning systems is that they use chlorofluorocarbons (CFC's) which are considered to destroy the earth's ozone layer. A system which utilizes CFC's is disclosed in U.S. Pat. No. 4,443,269 to Capella, et al. ("Capella"). Capella discloses a decontamination method for radioactive tools utilizing a high pressure spray gun for spraying the contaminated tools with freon. The general solution is to utilize more benign cleaning solvents, such as carbon dioxide. Carbon dioxide is particularly advantageous because it is a nonpolar solvent so that cosolvents may be added for a high degree of selectivity. It has been found that the cleaning capability of solvents such as carbon dioxide is enhanced when the solvent is raised to supercritical temperatures and pressures, or when supplemental cleaning techniques are utilized, such as pressure pulsing and sonic treatment.

The general concept of cleaning with supercritical fluids is known in the art. U.S. Pat. No. 5,013,366 to Jackson, et al. ("Jackson") discloses a cleaning process using phase shifting of dense phase gases. The solvent is shifted from its critical state to the liquid state and back by temperature adjustment while the solvent is in contact with the part to be cleaned. The cleaning apparatus utilized in Jackson is shown in FIG. 6. However, Jackson discloses no internal filtration for the cleaning fluid so that cleaning fluid which has removed contaminants from the part may redeposit the same on the part during circulation through the vessel.

Other cleaning systems utilizing circulated fluids, such as air, are disclosed in U.S. Pat. Nos. 4,936,22; 4,832,753; 4,844,743; 4,576,792; and 4,290,821. However, none of these systems is directed to supercritical cleaning. An apparatus for treating a workpiece at elevated temperatures and pressures is disclosed in U.S. Pat No. 4,151,400 to Smith, Jr., et al. Additionally, an electric oven having an internal circulation fan and heating elements is disclosed in U.S. Pat. No. 1,986,088 to Wild. Neither of these patents is directed to cleaning.

Finally, regarding cleaning fluid regeneration, Jackson schematically discloses in FIG. 4 a separator 28 in communication with the outlet on the cleaning vessel for recycling cleaning fluid. More detailed disclosures for devices used to separate liquid and other substances from gases may be seen in U.S. Pat. Nos. 4,879,004; 4,657,487; 4,441,871; 3,997,303; and 3,063,259. However, none of these patents is directed to a filter or separator for use in regenerating cleaning fluids for precision cleaning.

The apparatus used for precision cleaning is critical to success of the system. The apparatus must afford a high degree of temperature and pressure control and must be resistant to the high pressures required to achieve supercritical states. The apparatus must also be adaptable to remove particulates to varying degrees, especially when the apparatus is used in connection with parts testing. Importantly, the apparatus must be adapted to continuously circulate cleaning fluid in a closed system, yet avoid reapplication of contaminants onto the parts. Finally, the apparatus must provide uniform temperature and pressure throughout the cleaning vessel, while simultaneously maintaining different temperatures and pressures in other components of the overall system. It is an advantage according to this invention to satisfy all of the above stated requirements.

SUMMARY OF THE INVENTION

Briefly, according to this invention, there is provided an apparatus for precision cleaning, including a pressure vessel having a cleaning drum for receiving a workpiece. The drum has an extended body, preferably vertically oriented, with an entry filter and an exit filter thereon, and the drum body cooperates with the entry and exit filters to define a sanitized work zone. The pressure vessel further defines an annular space around the drum body. The cleaning drum is preferably removable.

The cleaning fluid is introduced through an inlet into the annular space and by the action of a positive circulation device is directed along the drum body. The cleaning fluid then enters the work zone through the entry filter where it contacts the workpiece to remove particulates and dissolve contaminants thereon. The cleaning fluid then passes through the exit filter and recirculates to the annular space, with a portion of the cleaning fluid drawn from the work zone through an outlet when a downstream let-down valve is opened. A heating element in the vessel, along with the let-down valve may be controlled to maintain the cleaning fluid in a supercritical state. Alternatively, phase shifting of the cleaning fluid may be effected if desired.

Preferably, the filters are interchangeable to vary the mesh size of particulates passable therethrough. Also, the apparatus preferably includes a mesh basket, or other suitable device, in the work zone for supporting the workpiece. The drum body should be impermeable to the cleaning fluid to avoid intermixing spent and regenerated cleaning fluid.

Preferably, a separator is provided in combination with the pressure vessel to remove particulates and mist from the cleaning fluid. The separator comprises an elongated body with a concentric feed tube. The feed tube has a plurality of longitudinally spaced apertures adjacent its distal end, and first and second filters are carried on the feed tube. An outlet is adjacent the upper end of the body in communication with the second filter. A collection chamber and drain are located at the lower end of the body.

The spent cleaning fluid passes through the feed tube and is introduced to the filters through the spaced apertures. The filtered cleaning fluid then exits the separator through the outlet, with the coalesced particulates and mist falling from the filters to the collection chamber to be removed through the drain.

Because the cleaning fluid is typically introduced to the separator in a combined liquid/vapor state, the separator preferably includes an inner capsule enclosing the first filter and having an elongated outlet at its lower end. Spent cleaning fluid passes through the first filter and enters the capsule, wherein coalesced particulates and contaminants, along with liquefied cleaning fluid, passes downward through the outlet into the collection chamber. The liquid is heated to distill contaminants therefrom. Vaporized cleaning fluid comes out of the solution with the contaminants and passes upward around the capsule and through the second filter to the separator outlet. Distilled contaminants are periodically evacuated through the drain. A level indicating device maintains a predetermined amount of liquid in the collection chamber.

It has been found that this separator arrangement, in line with the cleaning vessel, provides a high degree of cleanliness in the fluid itself, despite the continued recirculation of the fluid into contact with the contaminated parts. This avoids redeposition of contaminants onto the parts.

Finally, the invention includes a computer controlled system for cleaning a workpiece with a supercritical cleaning fluid. The system includes a cleaning vessel as generally described above, a let-down valve in communication with the cleaning vessel outlet, a separator in communication with the let-down valve, a condenser in communication with the separator outlet for condensing the cleaning fluid to a liquid state, and a storage vessel for maintaining the liquid fluid.

In operation, the liquid cleaning fluid is pumped from the storage vessel for cleaning operations and exposed to conditions of temperature and pressure which cause the cleaning fluid to achieve a supercritical state. The cleaning fluid is then circulated in the cleaning vessel as described, with a portion of the spent cleaning fluid removed from the cleaning vessel work zone at a predetermined rate when the let-down valve is opened. The removed portion is passed to the separator where it is regenerated. The regenerated cleaning fluid thereafter passes through the separator outlet to the condenser and from there back to the liquid storage vessel. The control means advantageously monitors and controls flow rates and temperatures throughout the system to maintain a driving pressures from the cleaning vessel to the storage vessel. The control means also balances optimal solubility levels with the need to maintain a base system pressure below which the pressure in none of the components falls so that commercially available condensing equipment may be used.

In a preferred embodiment the system also includes a bypass extending from a point downstream of the storage vessel to a second point upstream of the condenser. The bypass includes a valve which may be controlled to admit varying amounts of cleaning fluid into the bypass for controlling and pulsing the pressure within the cleaning vessel.

The following description, in conjunction with the accompanying drawings, discloses further details and advantages of the present invention.

DETAILED DESCRIPTION OF THE PREFERRED EMBODIMENTS

Figure 1:
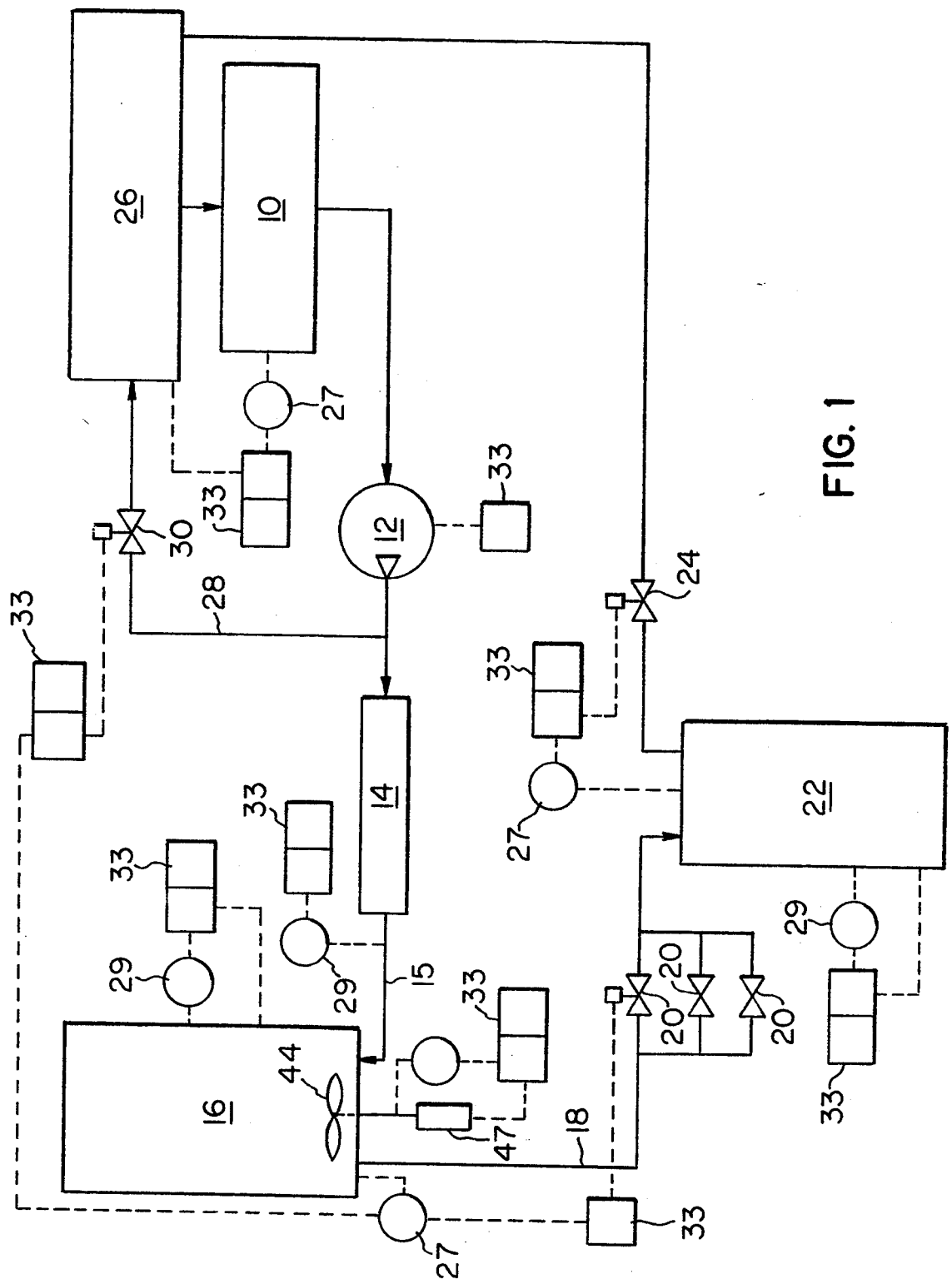
FIG. 1 is a schematic view of a supercritical cleaning system in accordance with the present invention.
Figure 2:
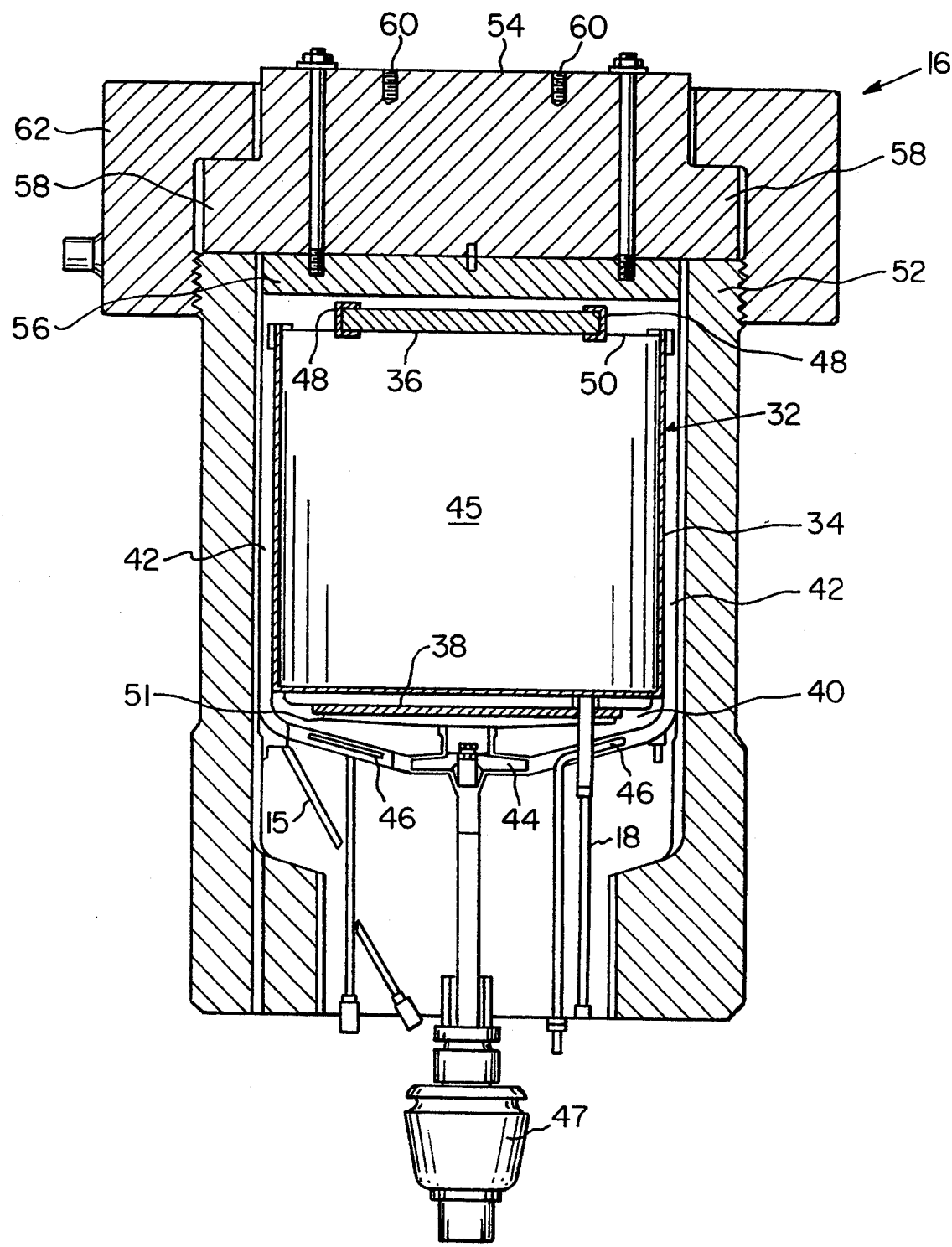
FIG. 2 is a cross section of a cleaning vessel in accordance with the present invention.
Figure 3:
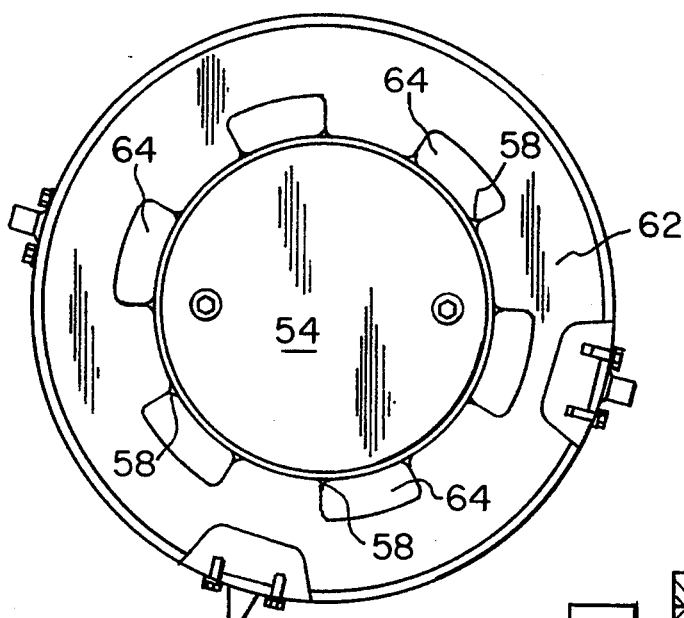
FIG. 3 is a plan view of the cleaning vessel of FIG. 2.
Figure 4:
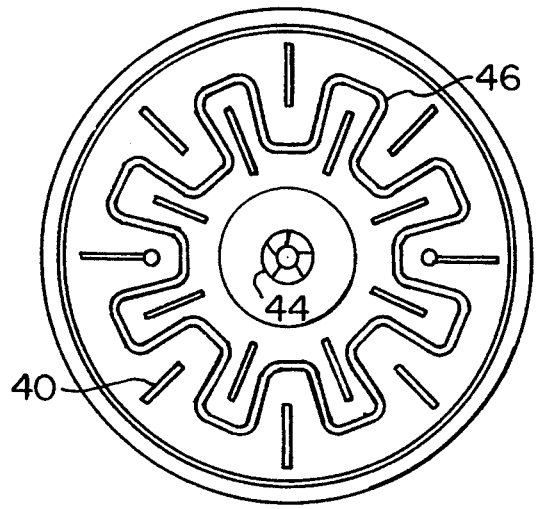
FIG. 4 is a plan view of an impeller and a heating element in the cleaning vessel of FIG. 2.
Figure 6:
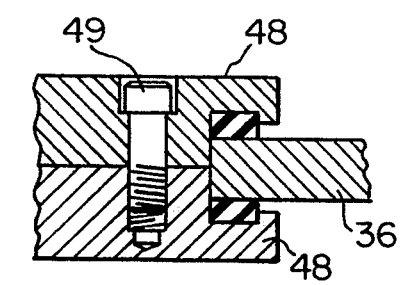
FIG. 6 is a cross section of a separator in accordance with the present invention.
Figure 7:
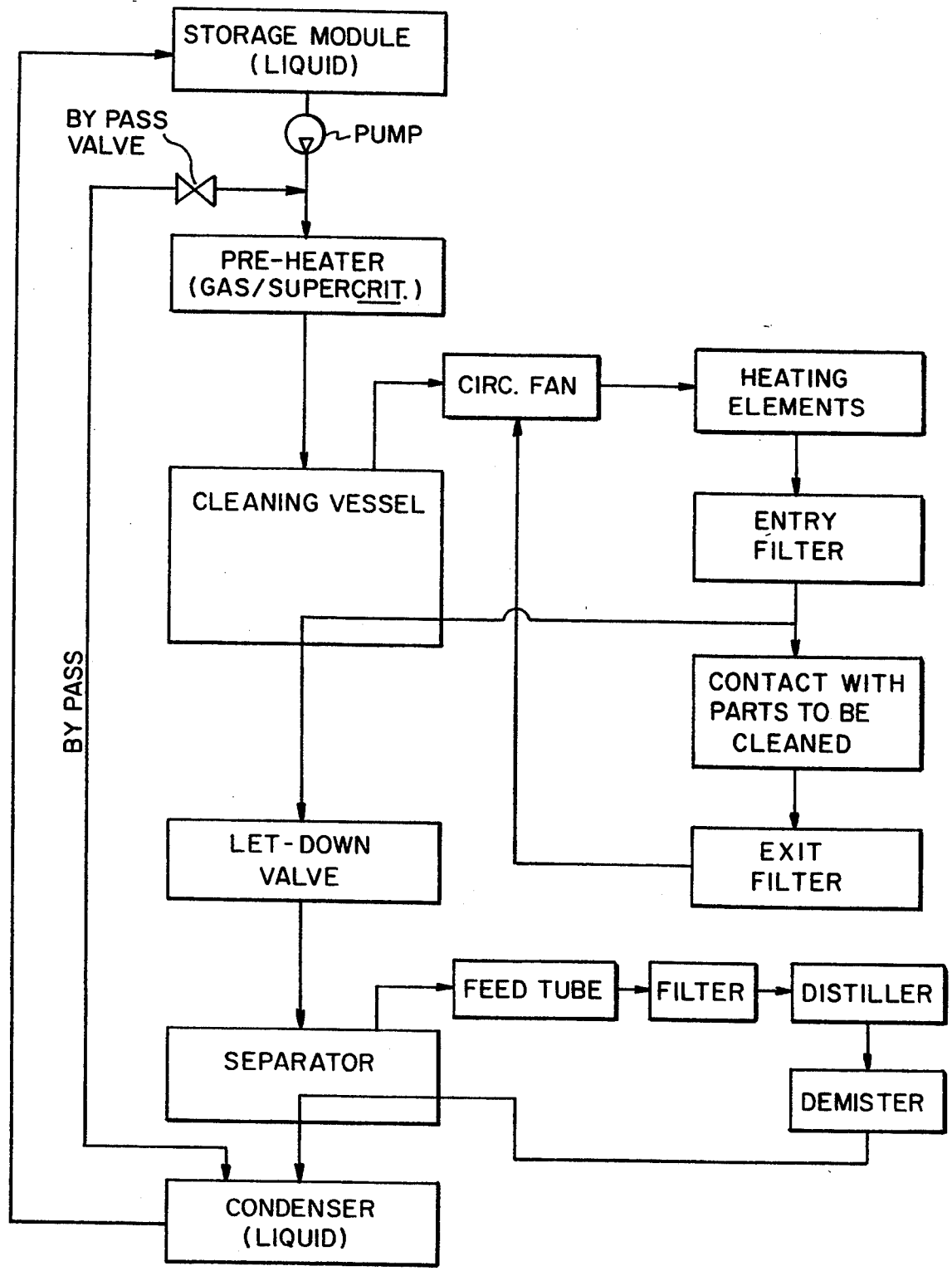
FIG. 7 is a flow chart describing the process with which the apparatus of the present invention is utilized.

FIG. 1 shows a system for supercritical cleaning in accordance with the present invention. Fig. 1 may be read in connection with Fig. 7 for an overview of the flow path through the system. The cleaning fluid circuit begins in a storage vessel 10 wherein the carbon dioxide is maintained in a liquid state. When a cleaning cycle is initiated, the liquid carbon dioxide is removed from storage vessel 10 by a liquid pump 12. The carbon dioxide is then passed through a preheater 14 where its temperature is increased to above its supercritical point. From the preheater 14, the carbon dioxide is then introduced through an inlet 15 into a cleaning vessel 16, where it is pressurized and internally circulated, as discussed below.

Spent carbon dioxide is removed from the cleaning vessel 16 via outlet 18, and the rate of removal is controlled by let-down valve 20. The carbon dioxide passes through let-down valve 20 and enters a separator 22, typically in a combined liquid and vapor phase. Flow through the separator is regulated by let-down valve 24. The gas and liquid are filtered, and liquid carbon dioxide and contaminants are distilled in the separator as discussed below. Contaminant-free gaseous carbon dioxide is passed to a condenser 26.

The system also includes a bypass 28 having a bypass valve 30 for short circuiting liquid carbon dioxide from the pump 12 directly to the condenser 26 when a predetermined maximum pressure is present in the cleaning vessel 16. Appropriate pressure monitors 27 and temperature monitors 29 are located throughout the system, along with appropriate controllers 33.

Referring to FIGS. 2-4 and 6, the cleaning vessel 16 includes an inner, removable drum 32 having an impermeable body 34 with a removable entry filter 36 at its upper end and a removable exit filter 38 at its lower end. The drum is removably placed on a seat 40 inside the vessel 16, and the vessel 16 and drum body 34 cooperate to define an annular space 42 around the drum. The filters and the drum body cooperate to define a sanitized work zone 45, as discussed below.

An impeller 44 is located beneath seat 40 as is an electric heater 46. The impeller is driven by an electric motor 47. Means (not shown), such as a mesh basket, a series of racks or shelves or other arrangement, are located inside work one 45 for holding the parts to be cleaned.

The filters 36, 38 may be interchanged with filters of varying mesh sizes, for example 40 microns, 30 microns, 20 microns, etc., to vary the mesh size of particulates passable therethrough. To facilitate interchangeability, tapped brackets 48 are located on a top 50 of drum 32. The brackets 48 clamp entry filter 36 into position, utilizing a threaded bolt 49 or the like. The exit filter 38 rests in a recess 51 in seat 40.

The cleaning vessel 16 has a threaded upper lip 52, and a top cover 54 rests on the upper lip. The top cover has a seal plate 56 whose outer diameter corresponds to the inner diameter of vessel 16, along with a plurality of radially outward directed splines 58. Top cover 54 is also provided with drilled taps 60 for receiving a lift device (not shown).

A top nut 62 is threadingly received on upper lip 52 and may be wound down to clamp the top cover 54 and seal plate 56 onto the cleaning vessel 16 in a pressure resistant manner. The top nut includes a plurality of keyways 64 which receive splines 58 in the top cover 54.

In operation, preheated carbon dioxide is pumped into the cleaning vessel 16 via inlet 15 until a sufficient volume is present to maintain the desired pressure. Temperature is controlled by heater 46, and a temperature and pressure controller 33 is preset to maintain the carbon dioxide in a supercritical state while in the cleaning vessel 16. Carbon dioxide is introduced from the inlet 15 to the annular space 42, and the impeller 44 ensures circulation upward along body 34, and downward through entry filter 36 into the sanitized work zone 45. The internal filtration prevents redeposition of contaminants onto the parts once contaminants have been removed therefrom. The let-down valve 20 and pump 12 are controlled to maintain pressure in cleaning vessel 16 throughout the cleaning cycle. In this regard, relatively small amounts of carbon dioxide are removed from work zone 45 through outlet 18 when let-down valve 20 is opened.

After the cleaning cycle is completed, the let-down valve is further opened to begin a pressure release from cleaning vessel 16. Particularly, the pressure release should be maintained at a continuously varying rate to avoid carbon dioxide impregnation into the parts to be cleaned. Such impregnation could cause explosion or formation of gas bubbles in the parts. To facilitate this technique, several let-down valves 20 in parallel may be placed in communication with outlet 18, each opened in succession to maintain the desired flow rate and pressure release from cleaning vessel 16.

Figure 5:
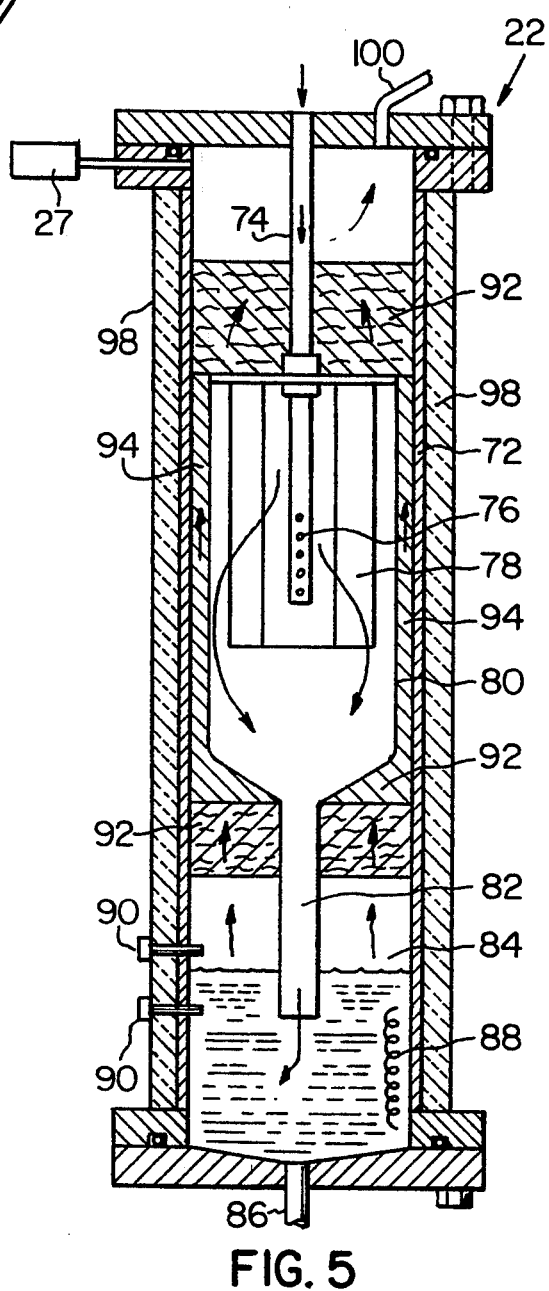
FIG. 5 is an isolation view of an entry filter arrangement for the cleaning vessel of FIG. 2.

After passing through let-down valve 20, the cleaning fluid typically changes to a combined liquid and vapor phase. At this time it is introduced to separator 22, shown in FIG. 5. The separator 22 includes an elongated body 72 with a concentric feed tube 74. The feed tube has a plurality of spaced apertures 76 adjacent its distal end and carries a first particulate filter 78 adjacent the apertures 76. Although not shown in detail, the first filter 78 contains a plurality of folded pleats having orifices which increase in size as they progress radially outward on the filter. This arrangement provides a coalescing effect for particulates in the cleaning fluid. The first filter is sealed at its upper and lower ends so that all cleaning fluid issuing from the feed tube must pass through the first filter.

An inner capsule 80 surrounds first filter 78 and has an elongated outlet 82 at it,s lower end, while being sealed at its upper end. The outlet is disposed in a collection chamber 84 at the lower end of separator body 72. The collection chamber 84 may be evacuated through a drain 86. An internal heater 88 and a pair of thermocouples 90 are disposed in the collection chamber.

A second de-misting filter 92 surrounds inner capsule 80 and occupies a vapor passageway 94 between the capsule 80 and the inside of body 72. The second filter is constructed of compacted mesh wire for coalescing mist from uprising cleaning fluid vapors.

In operation, spent carbon dioxide passes through apertures 76 in feed tube 74 and enters first filter 78. Liquid carbon dioxide and coalesced contaminants fall through outlet 82 of inner capsule 80 into collection chamber 84. Thermocouples 90 detect temperatures to monitor the liquid level in collection chamber 84 so that controller 33 can operate heater 88 to maintain the liquid level above outlet 82. Thus, pressurized cleaning fluid in the gaseous state is bubbled up through the liquid in the collection chamber to further remove particulates and mist from the gaseous fluid. The internal heater provides heat to liquid in the collection chamber so that the liquid is essentially in a continuous boiling state, with carbon dioxide vapor emanating from the liquid substantially free of contaminants. The remaining contaminants and liquid are periodically evacuated through drain 86.

Utilizing control valve 24, and pressure monitor 27, the pressure in the separator is controlled so that the carbon dioxide vapor exits the separator at a pressure which maintains minimum contaminant solubility in the carbon dioxide. The separator may be provided with insulation 98 for more accurate heat control. Treated vapor exits through outlet 100 at the upper end of the separator.

The control scheme employed for the cleaning system is as follows. The internal heaters of the preheater, cleaning vessel and separator vessel are controlled by independent Proportional, Integral and Derivative Term ("PID") controllers 33. Maximum temperature set points in these vessel are preprogrammed and, if exceeded, the controller will disconnect power to the appropriate heater. Flow rates in the system are controlled by varying the number of strokes per minute of pump 12 using controller 33. Pump 12 is preferably a positive displacement liquid pump having a constant volume per stroke.

Pressures in the cleaning vessel and separator vessel are independently maintained, while achieving maximum flow throughout the entire system. During the cleaning cycle, maximum system pressure is located in the cleaning vessel, with incrementally lower pressures found in the separator vessel through the condenser into the storage vessel. A base system pressure, below which pressure in none of the components of the system may drop, is maintained in the storage vessel. This ensures that commercially available condensation equipment may be used in the condenser. Lower pressures would necessitate more expensive, sophisticated equipment in order to condense the carbon dioxide to a liquid state. The incrementally stepped pressure distribution also ensures that there is a driving force from the cleaning vessel through the system to the liquid storage vessel so that only one pump is required in the system for proper flow rates.

During the pressurization portion of the cleaning cycle, valves 20, 24 and 30 remain closed until the cleaning vessel target pressure is reached. At that time, the flow mode is activated and valve 30 will open if the pressure in the cleaning vessel exceeds the target cleaning vessel pressure. This admits liquid carbon dioxide into the bypass to avoid further pressurization of the cleaning vessel. To minimize the amount of liquid carbon dioxide which must be bypassed, valve 20 is automatically opened to release pressure in the cleaning vessel 16. The control system proportionally closes valve 30 while opening valve 20, and this valve action can be tuned so that 90-100% of the output of the liquid pump 12 is forced to go through the preheater 14 and into the cleaning vessel 16, as opposed to being bypassed.

When valve 20 is opened, carbon dioxide is forced into separator 22. The resulting increase in the separator pressure will cause valve 24 to open if the following two conditions are met:

1) $P_{separator} > P_{liquid\ storage} + 25\ psi$; and
2) $P_{separator} >$ separator target pressure $+$ "x" psi (where "x" is operator adjustable).

Once a predetermined amount of carbon dioxide (operator setable) has flowed through the system, the control system will initiate a let-down sequence which reduces pressure in the cleaning vessel. When the cleaning vessel pressure approaches a preset pressure higher than the base pressure, the let-down sequence is defeated and a vent from the cleaning vessel directly to atmosphere is activated. The cleaning vessel 16 may then be opened and the contaminant-free parts removed. Additionally, heater 46 is operated during let-down to warm the cleaned parts so that atmospheric moisture does not condense on the parts when the cleaning vessel is opened.

Having described the presently preferred embodiments of the invention, it will be understood that it is not intended to limit the invention except within the scope of the following claims.

We claim:

1. An apparatus for precision cleaning a workpiece with a cleaning fluid comprising liquid carbon dioxide at temperatures and pressures which cause the cleaning fluid to achieve a supercritical state, said apparatus comprising:
   a pressure vessel, an open ended cleaning drum positioned within the pressure vessel for receiving the workpiece, said drum having an extended body with an exit filter adjacent the lower end of said drum body, said drum body cooperating with said exit filter to define a work zone for receiving a workpiece, said pressure vessel and drum further defining an annular space around said drum body;
   a cleaning fluid comprising liquified carbon dioxide within the work zone such that the workpiece is submerged therein;
   an inlet;
   an outlet;
   said inlet opening into the pressure vessel in communication with the annular space and said outlet drawing directly from the work zone such that cleaning fluid newly introduced into the vessel is mixed with fluid that has been circulated around the drum prior to being withdrawn through the outlet; and
   means within the pressure vessel for circulating cleaning fluid around said drum down through said work zone and up along the annular space such that cleaning fluid introduced through said inlet may be directed along said drum body, then through said work zone where it contacts the workpiece, finally passing through said exit filter and recirculating to the annular space, with a portion of the cleaning fluid drawn from said outlet.

2. The apparatus of claim 1 wherein said drum body is impermeable to the cleaning fluid.

3. The apparatus of claim 1 further comprising means for removably interchanging said filters to vary the mesh size of particulates passable therethrough.

4. The apparatus of claim 1 further comprising a base on which said cleaning drum is removably supported, said base defining a recessed filter seat for supporting said exit filter.

5. The apparatus of claim 1 further comprising a heating element for controlling the temperature within said pressure vessel.

6. The apparatus of claim 1 further comprising a let-down valve in communication with said outlet.

7. A separator for removing particulates and mist from a cleaning fluid in a system for cleansing a workpiece at supercritical conditions, comprising:
   an elongated body having an upper end and a lower end, said lower end having a drain;
   a feed tube having a proximal end and a distal end extending into said body, said feed tube having a plurality of apertures adjacent its distal end;
   a tubular filter having an upper sealed end and a lower sealed end and being carried on the distal end of said feed tube adjacent said apertures;
   a second filter carried on said feed tube at its proximal end;
   an outlet adjacent the upper end of said elongated body and in communication with said second filter; and
   a collection chamber located adjacent the lower end of the body;
   such that the cleaning fluid passes through said feed tube and is introduced to said first filter through the apertures, passes through said first filter where contaminants in the fluid are coalesced, then passes to the collection chamber where cleaning fluid is vaporized then passes through said second filter where mist is separated from the vaporized cleaning fluid, and exits the body through said outlet, with coalesced contaminants and mist falling from the filters to the collection chamber to be removed through said drain.

8. The separator of claim 7 further comprising a heating element for controlling the temperature within said collection chamber.

9. The separator of claim 8 further comprising an inner capsule having a sealed upper end and an open lower end, said capsule enclosing the first filter and having a tubular outlet at its lower end, said capsule and elongated body defining an annular vapor passageway between the capsule and the body, such that cleaning fluid passes through the first filter and enters the capsule in a combined liquid/vapor state, passing downward through the outlet into the collection chamber where the liquid is collected and heated to distill contaminants therefrom, vaporized cleaning fluid then passing upward through said annular vapor passageway and through the second filter to the separator outlet, nonevaporated contaminants removed through the drain.

10. The separator of claim 9 wherein said tubular outlet is sufficiently long to extend below a liquid level in said collection chamber so that vaporized cleaning fluid may be bubbled through the liquid.

11. The separator of claim 7 further comprising at least one temperature monitor for measuring temperatures within said collection chamber.

12. The separator of claim 7 further comprising a level indicator device for maintaining a predetermined liquid level in said collection chamber.

13. A system for cleaning a workpiece with a supercritical cleaning fluid, comprising:

a pressure vessel, an open ended cleaning drum positioned in the vessel and defining a work zone for receiving the workpiece, said pressure vessel enclosing an annular space around said drum, said pressure vessel having an inlet in communication with said annular space and an outlet in communication with said work zone;

a let-down valve in communication with said outlet;

a heater for controlling the temperature of said cleaning fluid;

a separator in communication with said let-down valve, said separator having a body with an inlet and an outlet and a contaminant drain at a lower end of the separator;

a condenser in communication with said separator outlet for condensing gaseous cleaning fluid to a liquid state;

a storage vessel for maintaining the liquid cleaning fluid;

a pump for conveying cleaning fluid from the storage vessel to the cleaning vessel; and control means for monitoring temperatures and pressures and operating said let-down valve, said heater and said pump to maintain predetermined pressures, temperatures and flow rates throughout said system;

such that liquid cleaning fluid may be pumped from the storage vessel to the pressure vessel and caused by temperature and pressure to achieve a supercritical state, with the cleaning fluid circulated through the annular space into said work zone during a cleaning cycle, said cleaning fluid removed from the work zone after said cleaning cycle when said let-down valve is opened, said removed portion passed to the separator where it is regenerated, with the cleaning fluid thereafter passing through the separator outlet to the condenser and from there back to the liquid storage vessel, with separated contaminants collecting in the lower end of the separator for removal through said drain.

14. The system of claim 13 further comprising a bypass in communication with said pump and said condenser, said bypass having a valve which, when opened by said control means, admits cleaning fluid into said bypass to control the pressure within said cleaning vessel.

15. The system of claim 13 further comprising a plurality of let-down valves arranged in parallel for enhanced pressure reduction in said cleaning vessel after completion of said cleaning cycle.

16. The system of claim 13 further comprising distillation means in said separator for boiling liquid cleaning fluid and contaminants to liberate vaporized cleaning fluid, said separator having a filter in communication with said Separator outlet, said vapor passing through said filter and said outlet and from there to said condenser.

17. The apparatus of Claim 1 further comprising an entry filter on said Cleaning drum, said entry filter cooperating with said cleaning drum and said exit filter to define said work zone.

* * * * *